Dec. 13, 1966 G. R. MIDTBO ETAL 3,291,281

ADJUSTABLE LIVESTOCK FEEDER

Filed Oct. 27, 1964

INVENTORS
GUY R. MIDTBO
RAYMOND S. WILKES

BY

John M Nolan

ATTORNEY sion of the assembled auger and retaining walls relative to the bunk floor and also in the suspension of the auger relative to the retaining walls. Rather than use rigid arms to suspend the assembled auger and walls relative to the bunk floor, and separate springs to partially overcome the weight of the assembly, the present invention suspends the assembly by means of flat springs with one end affixed to the bunk floor and the other end affixed to the walls. The springs may deflect until the walls rest on the bunk floor. However, the springs urge the assembly toward its uppermost position. This eliminates the need for separate helical springs which could interfere with the livestock feeding or have adjacent coils become clogged with feed.

The present invention is also an improvement in the suspension of the auger relative to the walls. Rather than provide a separate suspension of the auger from the bunk floor, as previously disclosed, the auger is suspended from a horizontal member between the walls by means of a vertical support which is vertically adjustable relative to the horizontal member.

Accordingly, an object of the present invention, is to provide a conveying and distributing device which is vertically adjustable relative to the floor of a livestock feed bunk.

Another object of the present invention is to provide an improved suspension of an assembled auger and retaining walls for vertical adjustment of the auger and retaining walls relative to the floor of a bunk feeder.

Another object of the invention is to provide such suspension wherein the suspension device comprises a series of longitudinally spaced flat springs with one end affixed to the floor of the feed bunk and the other end affixed to the retaining walls so that the entire assembly will raise or lower in response to longitudinal movement of the assembly.

Another object is to provide such flat springs which will deflect under the weight of the assembled auger and retaining walls, urging the assembly in a raised position.

Another object of the present invention is to provide means for vertically raising or lowering the auger relative to the retaining walls, said means being supported by the retaining walls.

Another object is to provide screw thread means for raising or lowering the auger relative to the retaining walls.

Still another object is to provide an assembled auger and retaining wall suspension for a feed bunk, including means to help overcome the weight of the assembly and also means for vertically moving the auger relative to the retaining walls, which means are simple and inexpensive to manufacture and easy to operate and maintain.

These and other objects and advantages of the invention will become apparent from the accompanying drawings and following description wherein an embodiment of the invention is described.

Figure 1:
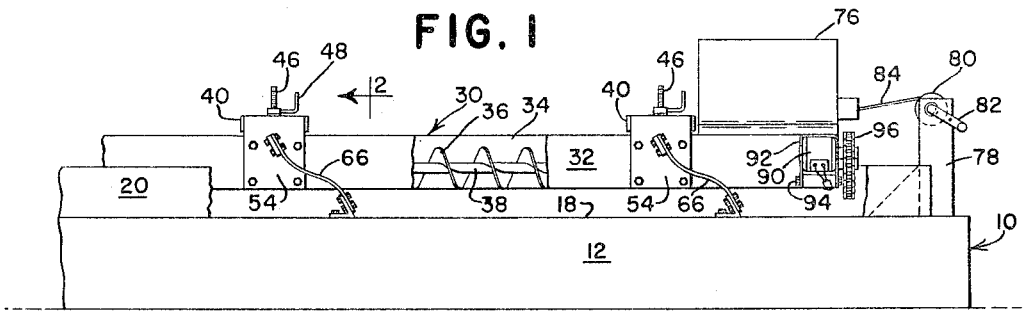
FIG. 1 is a side elevation view of the hopper and portions of the livestock feeder, with portions of the side boards and retaining walls removed.
Figure 2:
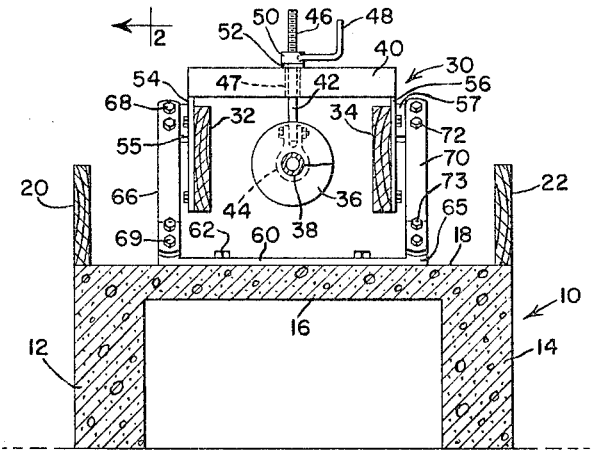
FIG. 2 is a section view taken along line 2—2 of FIG. 1.

Referring now to the drawings, there is shown an elongated feed bunk 10 comprising opposite upright side walls 12 and 14 supporting a horizontal table portion 16 at their upper ends, the top surface of the table portion forming a floor 18 of the bunk. The bunk is usually made of concrete, although other materials may readily be used. Opposite side boards 20 and 22 extend vertically from the longitudinal edge of the floor 18, and form in conjunction with the floor, a trough which retains the material for feeding the livestock.

The conveyor means, indicated generally by the numeral 30, includes an auger 36 longitudinally disposed between opposite vertical retaining walls 32 and 34 which extend the length of the bunk. The auger is supported in this position by a plurality of horizontal support members 40 which extend transversely over the retaining walls at spaced intervals along the length of said walls. A vertical suspension member 42 depends from each horizontal member, and has a journal 44 at its lower end supporting the auger shaft 38. The upper end of said suspension member has a screw thread 46 and extends through a vertical bore 47 in the horizontal member. A crank 48 carries a threaded nut portion 50, which is screwed onto the thread 46. A bearing washer 52, having a greater diameter than said bore 47, seats on the horizontal supporting member under the threaded nut. Thus, the vertical suspension member and consequently the auger can be raised or lowered relative to the horizontal support member and the retaining walls by threading the nut 50 up and down the thread 46 by means of the crank 48. As is apparent, the auger flighting is interrupted at the journal 44 to accommodate the vertical suspension member.

Also spaced longitudinally along the retaining walls are plates 54 on the outer surface of the retaining wall 32 and plates 56 on the outer surface of the retaining wall 34. The plates are fastened to the respective walls by means of bolts 58. The plates 54 have a transverse outward tab 55 and the plates 56 have a corresponding transverse outward tab 57.

A plurality of brackets 60 extend transversely to the retaining walls along the floor 18 and are fastened to the floor by bolts 62. Upwardly extending base tabs 64 and 65 project from opposite ends of each bracket. The brackets are longitudinally spaced at the same interval as the plates, and are offset a relatively short longitudinal distance from the plates toward the intake end of the auger.

A plurality of flat springs 66 are bendable longitudinally in a vertical plane parallel to the retaining walls and have one end affixed to the tabs 55 by means of fasteners 68 and the other end affixed to the tabs 64 by means of fasteners 69. The flat springs 70 are similarly affixed at one end to the tabs 57 by fasteners 72 and at the other end to the tabs 65 by means of fasteners 73. The conveyors are usually provided in sections approximately ten feet in length, the number of sections in any particular installation being variable to adapt the feeder to the requirements of the particular feed slot. The flat springs which support the conveyor and the auger suspension members are spaced at the ends of the auger sections.

At the intake end of the conveyor 30, a hopper 76 is mounted above the auger 36 for delivering feed to the auger. The auger is driven by a motor 90 mounted on a motor plate 92 which is rockably mounted about a pivot 94 carried by the retaining wall 32. The motor drives the auger through a drive means 96, illustrated as a chain drive herein. The weight of the motor tends to rotate the motor plate about the pivot 94, the drive means supporting the motor. Thus, the weight of the motor maintains proper tension in the drive means regardless of the relative positions of the auger and retaining walls.

An end support 78 projects vertically from the hopper end of the bunk, and carries a drum 80 rotated about an axis transverse to the retaining walls by a crank handle 82. A cable 84 is wound around the drum, the end of the cable being affixed to the hopper. By rotation of the handle a longitudinal force toward the hopper end of the bunk is exerted on the conveyor 30.

Figures 3, 4:
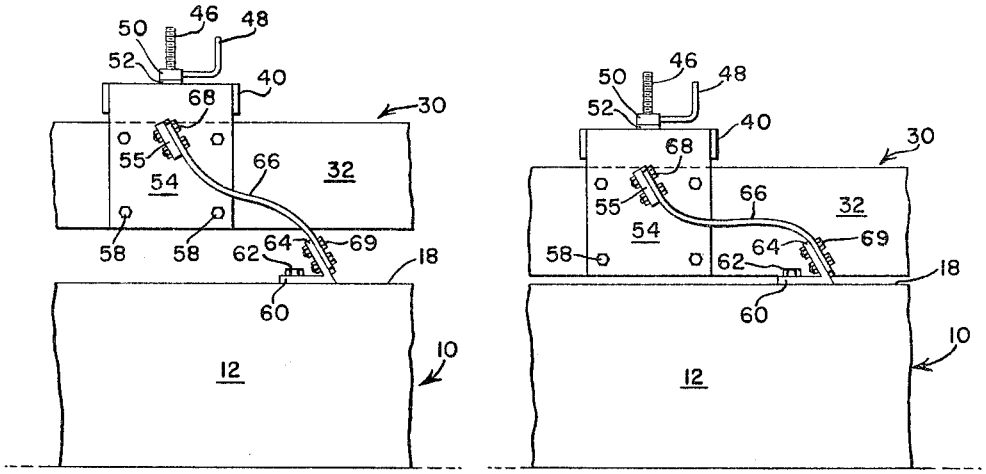
FIG. 3 is an enlarged front elevation view of a support portion, showing the assembled auger and retaining wall in a raised position.
FIG. 4 is the same view as FIG. 3, showing the auger and retaining walls in a lowered position.

The flat springs are the sole vertical support of the conveyor and hopper. Although the springs are fixed at each end, they will deflect in a longitudinal vertical plane. The springs are selected to have slightly less stiffness than required to support the weight of the conveyor. Consequently, without additional support, the weight of the conveyor would deflect the springs until the conveyor rests on the floor of the bunk as shown in FIG. 4. The conveyor is usually allowed to remain in this position during the initial period of the feeding operation to allow the feed to build up between the retaining walls and form a trough to move the feed along the conveyor. After the feed has built up for the desired distance along the conveyor, the conveyor and hopper are raised by rotating the crank handle and imparting a longitudinal force to the conveyor and hopper. It is apparent that this force will cause the flat spring to move in an approximate arc about the lower fixed ends to a raised position as shown in FIGS. 1 and 3. The height of the conveyor is thus controlled by the winch means, the force necessary to operate the winch to raise the conveyor and the hopper being substantially decreased by the force exerted by the deflected springs.

Other features and advantages of the present invention will occur to those skilled in the art, as will many modifications and alterations in the preferred embodiment of the invention as described herein, all of which may be achieved without departing from the spirit and scope of the invention.

What is claimed is:

1. A material distributing device comprising a longitudinally extending floor, a longitudinally extending auger type conveyor means disposed above the floor, means for vertically adjustably supporting the conveyor means above the floor comprising a plurality of elastically flexible, longitudinally spaced support members having one end affixed to the floor and the other end longitudinally offset from the floor end and attached to the conveyor means, the support members deflecting in a longitudinal vertical plane under the weight of the conveyor to allow the conveyor to seat approximately on the floor and exerting a substantial upward force on the conveyor, and control means operatively connected to the conveyor means for selectively raising or lowering the conveyor from or to the floor.

2. The invention defined in claim 1 wherein the elastically flexible support members are longitudinally spaced flat springs.

3. A material distributing device comprising: a longitudinally extending floor, a longitudinally extending conveyor means disposed above the floor including an auger disposed between upright opposed retaining walls parallel and adjacent to the auger, means for vertically adjustably supporting the conveyor means above the floor comprising a plurality of longitudinally spaced flat springs having one end affixed to the floor and the other end longitudinally offset from the floor end and attached to a retaining wall, each spring being offset the same distance in the same direction, the springs deflecting in a longitudinal vertical plane under the the weight of the conveyor to allow the conveyor to seat approximately on the floor and exerting a substantial upward force on the conveyor slightly less than the weight of the conveyor, and control means operatively connected to the conveyor means for selectively raising or lowering the conveyor means from or to the floor.

4. The invention defined in claim 3 wherein the flat springs are longitudinally spaced in adjacent pairs, one spring of each pair being attached to one retaining wall and the other spring being attached to the opposite retaining wall.

5. The invention defined in claim 4 wherein the control means exerts a longitudinal force on the conveyor means causing the conveyor to raise in an approximate longitudinal vertical arc about the spring end affixed to the floor.

6. The invention defined in claim 5 wherein the control means includes a support extending vertically from one end of the floor and a winch means carried by said support, including a cable having its end affixed to the conveyor, the end of each spring attached to the floor being longitudinally offset from the end of each spring attached to the retaining wall toward the winch means.

7. A material distributing device comprising: a longitudinally extending supporting structure including a floor, a pair of upright opposed longitudinally extending retaining walls, a longitudinally extending auger, a plurality of longitudinally spaced horizontal support members having one end affixed to one retaining wall and the other end affixed to the opposite retaining wall and a suspension member vertically adjustably depending from each support member, the auger being journaled in the lower end of said suspension members, an auger feeding hopper carried by said retaining walls at the intake end of said auger, means for driving said auger, and a plurality of longitudinally spaced flat springs having one end affixed to the floor and the other end longitudinally offset from the floor end and attached to a retaining wall, the retaining wall end of each spring being offset the same distance from the floor end away from the hopper end of the auger, the springs deflecting in a longitudinal vertical plane under the weight of the auger, retaining walls, and hopper to allow the retaining walls to seat proximate the floor, and exerting a substantial upward force on the retaining walls slightly less than the weight of the auger, retaining walls, and hopper, a support extending vertically from the hopper end of the floor and winch means carried by said support, the winch means including a cable operatively attached to the assembled auger retaining walls and hopper for selectively exerting a longitudinal force thereon toward said support, causing them to raise in an approximate longitudinal vertical arc about the spring end attached to the floor.

References Cited by the Examiner

UNITED STATES PATENTS

| | | | |
|---|---|---|---|
| 657,393 | 9/1900 | Buss. | |
| 2,889,942 | 6/1959 | Russell | 214—15 |
| 2,926,772 | 3/1960 | Reed | 198—213 |
| 3,037,613 | 6/1962 | Harmon | 198—213 |
| 3,105,586 | 10/1963 | Carew | 198—64 |
| 3,212,624 | 10/1964 | Hess | 198—220 |

FOREIGN PATENTS 525,369    5/1956    Canada.

SAMUEL F. COLEMAN, *Primary Examiner.*

EVON C. BLUNK, *Examiner.*

R. E. AEGERTER, *Assistant Examiner.*